United States Patent [19]
Achilleoudis

[11] Patent Number: 5,896,385
[45] Date of Patent: Apr. 20, 1999

[54] TRANSMISSION CONTROL METHOD BETWEEN A PLURALITY OF STATIONS AND CORRESPONDING STATIONS AND COMMUNICATION SYSTEMS

[75] Inventor: Nicos Achilleoudis, Paris, France

[73] Assignee: U.S. Philips Corporation, New York, N.Y.

[21] Appl. No.: 08/692,999

[22] Filed: Aug. 6, 1996

[30] Foreign Application Priority Data

| Aug. 9, 1995 | [EP] | European Pat. Off. | 95401869 |
| Aug. 9, 1995 | [EP] | European Pat. Off. | 95401870 |
| Mar. 27, 1996 | [EP] | European Pat. Off. | 96400658 |

[51] Int. Cl.$^6$ ............................................. H04J 3/16
[52] U.S. Cl. ..................................... 370/443; 370/458
[58] Field of Search ................................. 370/321, 322, 370/326, 329, 336, 337, 345, 346, 347, 348, 431, 442, 443, 444, 447, 449, 450, 451, 454, 455, 458, 459, 461, 464, 465, 468, 522, 528, 524, 523; 455/450, 451, 452, 464, 509, 510, 511

[56] References Cited

U.S. PATENT DOCUMENTS

| 4,736,371 | 4/1988 | Tejima et al. | 370/326 |
| 4,907,224 | 3/1990 | Scoles et al. | 370/443 |
| 5,384,777 | 1/1995 | Ahmadi et al. | 370/447 |

OTHER PUBLICATIONS

J.C. Dill, "A Minislot–Access Protocol For CDMA Packet Radio Networks With Positive Acknowledgement", 1989 IEEE Military Communications Conference, Oct. 15–18, 1989, Boston, MA, pp. 161–165.

Sigcomm'93—Communications Architectures, Protocols and Applications. Computer Communication Review (MSA)Year: 1993, Vol. 23, Part: No. 4, pp. 270–278, Author: Wenxin Xu, Campbell G. A Distributed Queueing Random Access Protocol . . . Source of Reference: Inspel.

*Primary Examiner*—Huy D. Vu
*Attorney, Agent, or Firm*—Robert McDermott

[57] ABSTRACT

The invention relates to a method of controlling the operation of a network in which stations share a communication channel. The upstream link of this channel is divided into time slots (4), consisting of a data slot (6) and m control minislots ($51a, \ldots, 51i, \ldots, 51m$). This method, comprising a reservation step provided for the transmission, within the minislots, of data packet transmission requests to a head-end station and a transmission step provided for the transmission of these data packets when corresponding acknowledgement signals have been returned to the concerned stations by the head-end station, also comprises an additional congestion resolution step, provided for improving the performance of transmission by an analysis of the occurrence of collisions between transmission requests within the minislots and a subsequent modification of the timing signals of the channel. This modification consists of an allocation of a part of the channel dedicated to the data slots to additional transmission requests, for example of at least an idle data slot (6).

7 Claims, 2 Drawing Sheets

TRANSMISSION CONTROL METHOD BETWEEN A PLURALITY OF STATIONS AND CORRESPONDING STATIONS AND COMMUNICATION SYSTEMS

BACKGROUND OF THE INVENTION

1. Field of the Invention

The invention relates to a method of controlling the transmission of data between a plurality of identified stations interconnected via a communication channel comprising at least an upstream channel at least partially shared by said stations, said upstream channel being divided into successive time slots of predetermined length consisting of a data slot and m control minislots, said method comprising:

(A) a reservation step, provided for defining a transmission order, within said control minislots, of data packet transmission requests generated by the stations and a transmission order of the corresponding data packets within the data slots;

(B) a transmission step, according to the following substeps:

(a) transmission of the data packet transmission requests via the upstream channel, in response to generated data packets;

(b) transmission of the data packets via the upstream channel;

The invention also relates to head-end and communication stations for carrying out this method, and to communication systems including such head-end stations.

This invention may be appreciated for satellite communication networks or any further kind of connection between remote stations, computers, and so on, and can be particularly used in the field of interactive television. More generally, the invention is useful in any situation in which various types of data processing devices have to communicate between them.

2. Description of the Prior Art

When such data processing devices, called stations for example, are interconnected through a common communication medium to form a network, they communicate according to a data communication protocol, that defines a set of rules organized in an accurate fashion. Generally speaking, the protocols can be classified as being either conflict-free or collision type. It is clear for instance that no problem of communication occurs when only two stations have to transmit data to each other. When more than two stations must communicate with one another over a common channel, it is likely (since all users can initiate transmission at arbitrary instants) that two users or more will decide to emit messages simultaneously, which leads to a collision between these messages (the concerned stations are said in contention). The data communication protocol must then be sophisticated enough to manage the loss of network throughput due to such collisions.

It has then be proposed a first family of protocols, according to which the channel time is divided into equally sized transmission slots and the messages into fixed length packets. These time slots may be known by their position within frames of fixed length and specifically assigned to each user who will therefore always send his message (comprising one or several fixed length packets) in the same time slots, for instance the i-th of each frame. The addressee simply knows that he has to listen to said i-th time slot of each frame in order to receive the message. Such a protocol is however limited to constant bitrate applications.

In a second family of protocols, the stations always generate messages of fixed length for transmission within slots of appropriate fixed length, but these time slots are no longer dedicated to specific users. One of the stations or a predetermined head-end station takes generally the control of the channel and of the traffic. When an user sends in any of the time slots a message regardless of what other users are doing, the head-end sends to said user an acknowledgement signal only if the message is well received. When no indication is returned, it means that a wrong transmission occurred (generally a collision between two or more messages, damaging all messages transmitted), and the user resends his message, until he receives the waited acknowledgement signal indicating that the transmission is now successful. In case of high loads, such re-transmissions may however require too much time.

An improved protocol, providing immediate access to the channel at light loads and better performances as the channel load grows, is described in the U.S. Pat. No. 5,390,181. According to this protocol, called DQRAP in a shorter form (Distributed Queueing Random Access Protocol), two conditions are fulfilled:

(a) the channel time is now divided into another type of time slot each of which consists of a constant number m of minislots (said control minislots) and one data slot;

(b) each station (or user) participates in the constitution of two common queues:

(1) the first one, called data transmission queue, organizes an ordered transmission of data packets emitted by stations within the data slots;

(2) the second one, called collision resolution queue, is activated when immediate access of a message to the channel is not possible, due to collisions between several data packets emitted simultaneously, and allows (also thanks to an ordered transmission of transmission requests) to resolve these collisions or to prevent further ones to occur.

This protocol DQRAP works in the following way. When a station wants to transmit a message (in a data slot), it must first transmit a corresponding message request in one of the control minislots, selected by rolling a m-sided die, m being generally rather weak and for instance equal to 3. If no other station is sending a similar transmission request at the same moment, the request can start immediately in the selected minislot and arrives safely at the head-end station which accepts it and broadcasts a corresponding acknowledgement signal to the stations. The message can then either be transmitted immediately if the data transmission queue is empty or take the following free place in said queue if some messages are already waiting for their transmission. On the contrary, when two or more stations try to send a message request in the same minislot simultaneously, collisions occur and none of the requests can be transmitted, which leads each user to try to ask for a re-transmission of his request (by rolling once more the m-sided die and selecting another minislot in the following set of minislots). This action must be performed until the conflict is solved, with a resulting loss of network efficiency.

Moreover, when the number of message transmission requests becomes very high, the number of collisions also increases and more and more minislots are required to solve them (at least two more minislots for each collision). As the number of available minislots is limited to m per time slot, an increasing time is required in order to consider the collisions and to answer new requests.

SUMMARY OF THE INVENTION

It is therefore an object of the present invention to propose a method the performances of which are significantly improved in the case of high load situations, when compared to the performances of the previously described protocol.

At this end the invention relates to a method as described in the preamble of the description, wherein said control method also comprises:

(C) a congestion resolution step, consisting of a conversion sub-step of at least an idle data slot into p additional control minislots as soon as and so longer as the number of requests is greater than a predetermined threshold.

This improved method is based on the fact that collisions between transmission requests prevent from sending data packets and that some data slots normally provided for the transmission of these data packets are therefore non occupied. According to the invention, these data slots identified as empty may be used for inserting additional minislots. These empty places, divided into additional minislots, are now occupied by additional transmission requests.

In another advantageous embodiment of the method, the step of increasing the length of the period allocated to the control minislots can be obtained by another type of time conversion.

At this end, the invention also relates to a method as described in the preamble of the description, but wherein said control method also comprises:

(C) a congestion resolution step, consisting of a conversion sub-step provided for increasing by p additional control minislots the predetermined length of the time slots as soon as and so long as the number of requests is greater than a predetermined threshold.

Preferably the concerned threshold is equal to the original number m of minislots per time slot.

Another object of the invention is also to propose a head-end station allowing to carry out said method.

At this end, the invention relates to a head-end station for carrying out a method of controlling the transmission of data between a plurality of identified stations interconnected via a communication channel comprising at least an upstream channel at least partially shared by said stations, said upstream channel being divided into successive time slots of predetermined length consisting of a data slot and m control minislots, said head-end station comprising timing signals generating means for defining said time division of the upstream channel and processing means for receiving within the control minislots data packet transmission requests generated by the stations and returning corresponding acknowledgement signals provided for authorizing the transmission of the corresponding data packets within the data slots, wherein said head-end station also comprises congestion detecting means, provided for indicating a congestion situation as soon as the number of received transmission requests is greater than a predetermined threshold, and control means, provided for modifying said timing signals in response to said congestion situation, said modification either consisting of a conversion of at least one idle data slot into p additional minislots as soon as and so longer as the number of requests is greater than said threshold or being carried out by increasing by p additional control minislots the predetermined length of the time slots as soon as and so long as the number of requests is greater than said threshold.

Another object of the invention is also to propose a communication station for the implementation of the method.

At this end, the invention relates to a communication station for carrying out a method of controlling the transmission of data between a plurality of identified stations interconnected via a communication channel comprising at least an upstream channel at least partially shared by said stations, said upstream channel being divided into successive time slots of predetermined length consisting of a data slot and m control minislots, said communication station comprising in combination:

(A) a local transmission request queue for a reserved transmission, within said control minislots and according to a defined transmission order, of transmission requests corresponding to data packets generated by the station;

(B) a local packet transmission queue for a reserved transmission, within said data slots and according to the transmission order of acknowledgement signals received in reply to said transmission requests, of the data packets corresponding to these requests;

(C) access control means of the transmission requests and the data packets to the upstream channel;

wherein additional control minislots are allocated to said access control means for increasing the length of said local transmission request queue as soon as the number of generated transmission requests is greater than a predetermined threshold and giving to this additional part of said queue a provisional priority for the access of the additional requests to the upstream channel so long as said number of requests is greater than said threshold, the additional minislots being generated for instance either in at least the first idle data slot or by increasing the predetermined length of the time slots by the required period.

Another object of the invention is still to propose a communication system including such stations and head-end stations.

At this end, the invention relates to a communication system for the transmission of data between a plurality of identified stations including a main one, or head-end station, and interconnected via a communication channel comprising at least an upstream channel at least partially shared by said stations, said upstream channel being divided into successive time slots of predetermined length consisting of a data slot and m control minislots, said system also comprising:

(A) a transmission request queue for a reserved transmission, within said control minislots and according to a defined transmission order, of transmission requests corresponding to data packets generated by said stations;

(B) a packet transmission queue for a reserved transmission, within said data slots and according to the transmission order of acknowledgement signals received in reply to said transmission requests, of the data packets corresponding to these requests;

(C) access control means of the transmission requests and the data packets to the upstream channel;

said head-end station comprising congestion detecting means, provided for indicating a congestion situation as soon as the number of received transmission requests is greater than a predetermined threshold, and control means, provided for modifying said timing signals in response to said congestion situation, said modification either consisting of a conversion of at least the first idle data slot into p additional minislots or being carried out by increasing by p additional control minislots the predetermined length of the time slots, as soon as and so long as the number of requests is greater than said threshold.

BRIEF DESCRIPTION OF THE DRAWINGS

The present invention will be now described in further detail with reference to the accompanying drawings, in which.

DETAILED DESCRIPTION OF THE PREFERRED EMBODIMENTS

Figure 1:
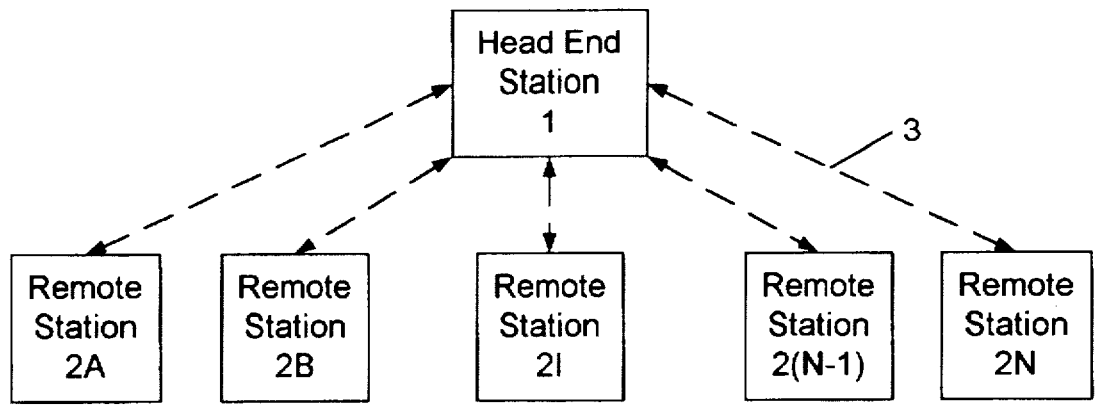
FIG. 1 shows schematically a communication system for the transmission of data between a plurality of stations.
Figure 2:
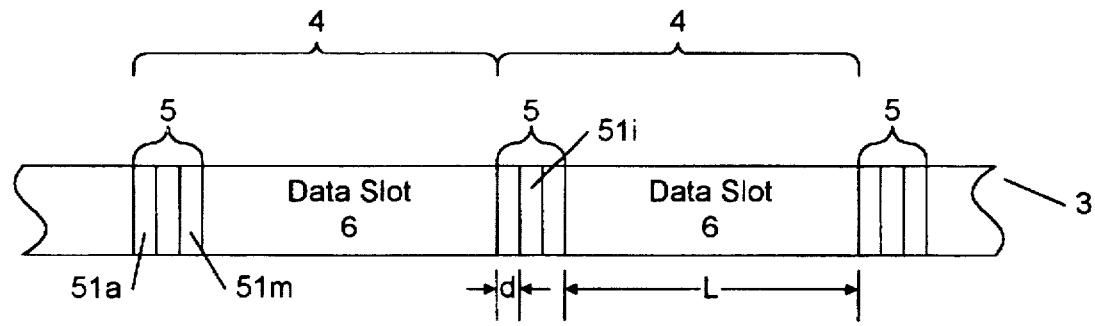
FIG. 2 illustrates the time division of the communication channel into a series of time slots.

As schematically represented in FIG. 1, a communication system comprises for instance a head-end station 1 and a plurality of remote stations 2A to 2N, provided for generating messages. In this system, all messages are transmitted in the form of data packets over a multiaccess broadcast channel 3 shared by the stations and comprising an upstream and a downstream channel. As illustrated in FIG. 2, the time is slotted: the upstream channel is divided into periodic intervals, that are successive time slots 4 of a predetermined length. Each of these time slots is partitioned into a control window 5 and a data slot 6. Each control window 5 consists of m control minislots 51a to 51m. The size of a data slot 6 is assumed to be the length L of the data packets generated by each station, but it is also possible that the complete messages need several data packets in order to be transmitted, each data packet being equal to the length of a data slot. The size of any control minislot 51i is denoted d.

Figure 3:
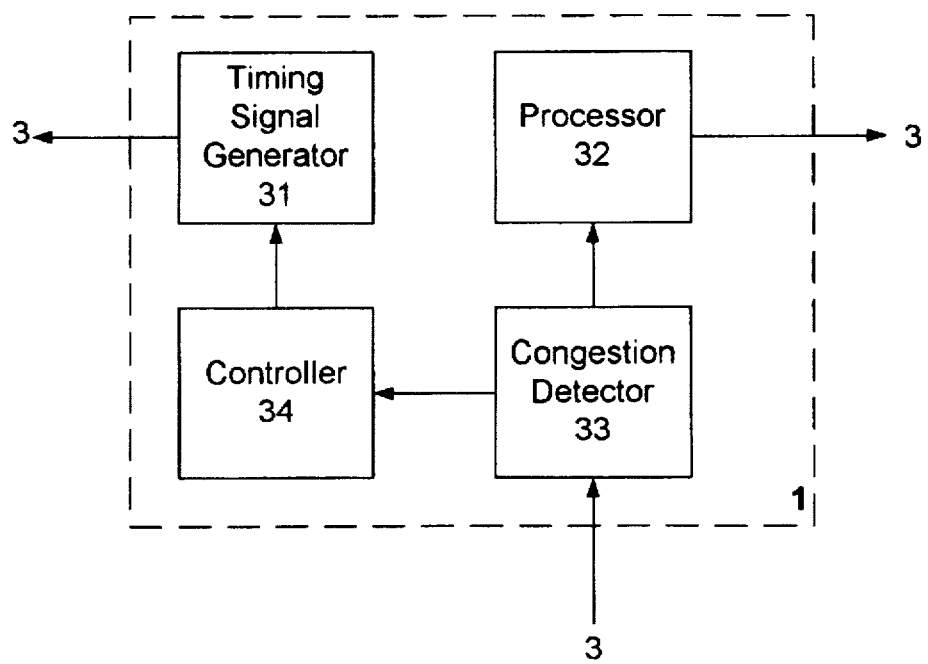
FIG. 3 shows a schematic embodiment of a head-end station carrying out the method according to the invention.

Although this size is dependent of the implementation, d is here always assumed to be much smaller than the data slot 6. Each time slot 4 has therefore a length equal to (L+md) and constitutes the upstream channel time unit. This time division of the upstream channel is carried out by the head-end station 1 that comprises at this end, as shown in FIG. 3, timing signal generating means 31.

The basic principle of such a system is to transmit the messages generated by the stations either directly at light loads (i.e. without delay, such an immediate access being possible when no station is in contention with another one and no risk of collision between messages occurs) or, when collisions occur, to solve each collision before trying another data packet transmission.

In order to implement such a principle, two queues are associated to the stations: a transmission request queue, and a packet transmission queue. At light loads, the method implemented by the system provides an immediate transmission, in the appropriate number of data slots 6, of the messages that have to be transmitted by substations. At high loads, when risks of collisions between messages occur, this immediate transmission step is replaced by a reservation step that uses said queues according to the following indications:

(a) the transmission request queue is intended to transmit in the control minislots the successive transmission requests originating from anyone of the stations, and this transmission of requests is based on the order according to which they are taken into account, defined by acknowledgement signals that are returned to the stations by processing means 32 of the head-end station 1 in order to authorize the transmission of the data packets corresponding to the transmission requests received and accepted;

(b) the packet transmission queue is intended to transmit in series from the concerned substations the data packets corresponding to said accepted transmission requests, and this transmission of data packets is based on the order according to which the corresponding requests have been accepted.

The illustrated system is then implemented by carrying out a method which allows to control the transmission of messages between the stations via the communication channel and comprises at this end a reservation step and a transmission step.

The reservation step is provided for defining in the local part (locally means: concerning a given station) of the transmission request queue a transmission order of the data packet transmission requests generated by the considered stations and to allow a reserved transmission, within the control minislots and according to said order, of these requests. The transmission step is provided for defining in the local part of the packet transmission queue a transmission order of the data packets corresponding to the accepted requests and to allow a reserved transmission, within the data slots and according to said order, of these data packets. Obviously, if a queue is empty, an admission to the upstream channel is immediate, and no particular transmission order has to be defined in order to define which request or which data packet will have to be transmitted.

The head-end station 1 also comprises (FIG. 3) congestion detecting means 33 that receive the transmission requests and are provided to indicate a congestion situation: when the number of data packet transmission requests is greater than a predetermined threshold, for instance the original number m of minislots per time slot, acknowledgement signals can no longer be returned to the stations (by way of processing means 32) for all the transmission requests, and a congestion resolution step during which control means 34 allow to modify the timing signals. According to a first advantageous embodiment, this step consists in a conversion of at least the first idle data slot into P additional control minislots as soon as said above-indicated criterion (number of requests not greater than said threshold) is no longer satisfied.

According to another embodiment, the congestion resolution step is provided for increasing by additional control minislots (by an additional number q) the predetermined length of the time slots. The conversion operation is carried out as soon as and so long as the number of requests is greater than said threshold.

In fact, it can be considered that, according to the original protocol DQRAP defined by steps (A) and (B), the packet transmission queue is intended to count the number of stations that are waiting for sending data and the transmission request queue is intended to count the number of data packets corresponding to collisions. The stations can be considered as including associated pointers directed to each queue and defining respective lengths of these queues, and the messages or data packets of the stations are then transmitted according to the following transmission rules:

(a) if the lengths of both queues are equal to 0 (i.e. if the queues are both empty), the data packets are immediately transmitted in the data slots (the transmission request queue is a kind of gateway through which stations have to pass in order to obtain a place in the packet transmission queue, but this passage is instantaneous if these queues are empty);

(b) if the transmission request queue is empty and the packet transmission queue not empty, the station which owns the first entry in the packet transmission queue transmits its message in a data slot, the station which owns the following entry in said queue transmits its message in the following data slot, and so on for all the concerned stations, the content of the packet transmission queue length counter being decreased each time a data packet is transmitted;

(c) each station increments the content of the packet transmission queue length counter by one each time a request corresponding to a minislot has been accepted, and therefore decrements said content by one for a successful transmission corresponding to an accepted request;

(d) each station increments the content of the transmission request queue length counter by the number of collisions between requests;

(e) the stations to which either successful requests or collided requests correspond know at any moment the positions in both queues and adjust their pointers accordingly.

The upstream channel 3 is shared in two parts, a first one for the transmission requests (the minislots) and a second one for the message requests (the data slots), and each of these parts is progressively occupied according to the respective contents of the queues. According to the invention and as illustrated in FIGS. 4 and 5, the channel 3 will now be occupied in a modified way when collisions occur and idle minislots are not numerous enough to allow to send further requests (or too much time is required in order to consider the collisions and answer new requests).

Figure 4:
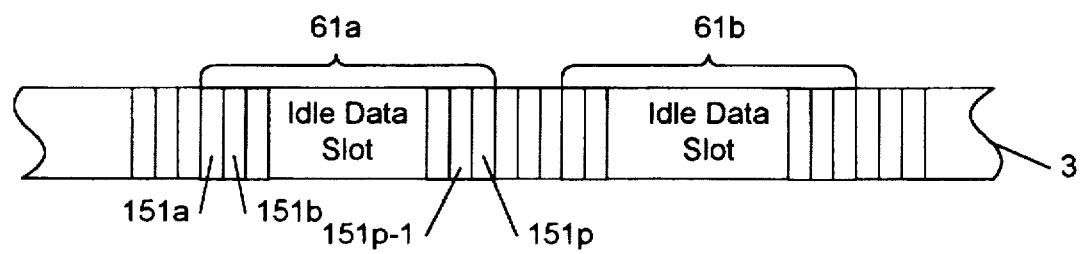
FIG. 4 and FIG. 5 illustrate, in comparison with FIG. 2, other types of time division of said channel, as modified according to the invention.
Figure 5:
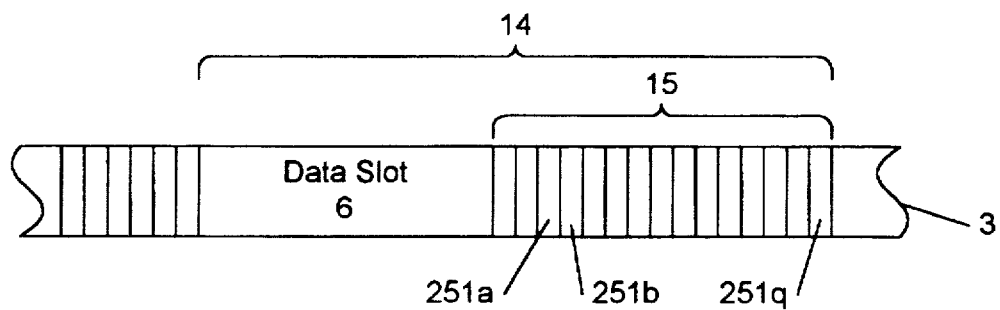

The additional congestion resolution step of the modified control method is provided for carrying out for example, in the first proposed embodiment (FIG. 4), the following operations:

(a) an analysis operation, in which, n being the number of collisions between transmission requests, the number of minislots necessary for solving these n collisions and transmitting all the corresponding requests is compared to a predetermined threshold and for instance m;

(b) the conversion operation itself: as soon as said necessary number is greater than m, at least the next idle data slot, called for instance 61a in FIG. 4 and corresponding in the channel 3 to a place reserved for a data packet transmission and not yet occupied by such a data packet, is divided into p additional control minislots 151a, 151b, ... 151p, (or several such idle data slots if necessary);

(c) end of the additional step: such a conversion operation is interrupted as soon as said necessary number decreases to a value no longer greater than m.

In the second proposed embodiment (FIG. 5), the additional congestion resolution step is also provided for carrying out the analysis and conversion operations, but the conversion operation is slightly different. As soon as (and so longer as) the number of requests is greater than the predetermined threshold, a modification of the upstream channel division is implemented, by increasing by q additional control minislots 251a, 251b, ... , 251q the predetermined length of the time slots, now referenced 14 (and the control windows having now a length denoted 15).

The present invention is obviously not limited to these method and system, from which modifications or improvements can be deduced without departing from the scope of the invention. For example, it is clear that the invention has been described in the particular case of time slots including m temporal minislots, but that this invention also concerns the case where these minislots, occupying the same short period, are no longer temporal ones but either frequential ones or minislots separated by orthogonal codes, as in the code-division multiplexing schemes.

I claim:

1. A method of controlling the transmission of data between a plurality of identified stations interconnected via a communication channel comprising at least an upstream channel at least partially shared by said stations, said upstream channel being divided into successive time slots of predetermined length consisting of a data slot and m control minislots, said method comprising:

(A) a reservation step, provided for defining a transmission order, within said control minislots, of data packet transmission requests generated by the stations and a transmission order of the corresponding data packets within the data slots;

(B) a transmission step, according to the following sub-steps:
(a) transmission of the data packet transmission requests via the upstream channel, in response to generated data packets;
(b) transmission of the data packets via the upstream channel;

wherein said control method also comprises:

(C) a congestion resolution step, consisting of a conversion sub-step of at least an idle data slot into p additional control minislots as soon as and so long as the number of requests is greater than a predetermined threshold.

2. A method according to claim 1, wherein said threshold is the original number m of minislots per time slot.

3. A head-end station for carrying out a method of controlling the transmission of data between a plurality of identified stations interconnected via a communication channel comprising at least an upstream channel at least partially shared by said stations, said upstream channel being divided into successive time slots of predetermined length consisting of
a data slot and
m control minislots, said head-end station comprising
means for generating timing signals, said timing signals defining said time division of the upstream channel and
processing means
for receiving within the control minislots data packet transmission requests generated by the stations and
returning corresponding acknowledgement signals provided for authorizing the transmission of the corresponding data packets within the data slots, wherein said head-end station also comprises
congestion detecting means, provided for indicating a congestion situation as soon as the number of received transmission requests is greater than a predetermined threshold, and
control means, provided for modifying said timing signals in response to said congestion situation, said modification consisting of a conversion of at least one idle data slot into p additional minislots as soon as and so longer as the number of requests is greater than said threshold.

4. A head-end station for carrying out a method of controlling the transmission of data between a plurality of identified stations interconnected via a communication channel comprising at least an upstream channel at least partially shared by said stations, said upstream channel being divided into successive time slots of predetermined length consisting of a data slot and m control minislots, said head-end station comprising means for generating timing signals said timing signals defining said time division of the upstream channel and processing means for receiving within the control minislots data packet transmission requests generated by the stations and returning corresponding acknowledgement signals provided for authorizing the transmission of the corresponding data packets within the data slots, wherein said head-end station also comprises congestion detecting means, provided for indicating a congestion situation as soon as the number of received transmission requests is greater than a predetermined threshold, and control means, provided for modifying said timing signals in response to said congestion situation, said modification being carried out by increasing by q additional control minislots the predetermined length of the time slots as soon as and so long as the number of requests is greater than said threshold.

5. A communication station for carrying out a method of controlling the transmission of data between a plurality of identified stations interconnected via a communication channel comprising at least an upstream channel at least partially shared by said stations, said upstream channel being divided into successive time slots of predetermined length consisting of a data slot and m control minislots, said communication station comprising in combination:

(A) a local transmission request queue for a reserved transmission within said control minislots and according to a defined transmission order, of data packet transmission requests corresponding to data packets generated by the station;

(B) a local packet transmission queue for a reserved transmission, within said data slots and according to the transmission order of acknowledgement signals received in reply to said transmission requests of the data packets corresponding to these requests;

(C) access control means of the transmission requests and the data packets to the upstream channel;

wherein:

additional control minislots are allocated to said access control means for increasing the length of said local transmission request queue as soon as the number of generated transmission requests is greater than a predetermined threshold and giving to this additional part of said queue a provisional priority for the access of the additional requests to the upstream channel so long as said number of requests is greater than said threshold, and said additional minislots are generated in at least the first idle empty data slot.

6. A communication system for the transmission of data between a plurality of identified stations including a head-end station, and interconnected via a communication channel comprising at least an upstream channel at least partially shared by said stations, said upstream channel being divided into successive time slots of predetermined length consisting of a data slot and in control minislots, said system also comprising:

(A) a transmission request queue for a reserved transmission, within said control minislots and according to a defined transmission order, of transmission requests corresponding to data packets generated by said stations;

(B) a packet transmission queue for a reserved transmission, within said data slots and according to the transmission order of acknowledgement signals received in reply to said transmission requests, of the data packets corresponding to these requests;

(C) access control means of the transmission requests and the data packets to the upstream channel; and (D) means for generating timing signals, said timing signals defining said time, slots;

said head-end station comprising congestion detecting means, provided for indicating a congestion situation as soon as the number of received transmission requests is greater than a predetermined threshold, and control means, provided for modifying said timing signals in response to said congestion situation, said modification consisting of a conversion of at least the first idle data slot into p additional minislots.

7. A communication system for the transmission of data between a plurality of identified stations including a head-end station, and interconnected via a communication channel comprising at least an upstream channel at least partially shared by said stations, said upstream channel being divided into successive time slots of predetermined length consisting of a data slot and m control minislots, said system also comprising:

(A) a transmission request queue for a reserved transmission, within said control minislots and according to a transmission order, of data packet transmission requests;

(B) a packet transmission queue for a reserved transmission, within said data slots and according to the transmission order of acknowledgement signals received in reply to said transmission requests, of the data packets corresponding to these requests;

(C) access control means of the transmission requests and the data packets to the upstream channel; and (D) means for generating timing signals, said timing signals defining said time slots;

said head-end station comprising congestion detecting means, provided for indicating a congestion situation as soon as the number of received transmission requests is greater than a predetermined threshold, and control means, provided for modifying said timing signals in response to said congestion situation, said modification being carried out by increasing the number of control minislots, as soon as and so long as the number of requests is greater than said threshold.

* * * * *